US012698979B2

(12) United States Patent
Niewiadomski

(10) Patent No.: US 12,698,979 B2
(45) Date of Patent: Aug. 4, 2026

(54) MAP PROCESSING

(71) Applicant: NVIDIA Corporation, Santa Clara, CA (US)

(72) Inventor: Robert Niewiadomski, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 165 days.

(21) Appl. No.: 18/310,375

(22) Filed: May 1, 2023

(65) Prior Publication Data

US 2024/0369375 A1 Nov. 7, 2024

(51) Int. Cl.
*G01C 21/00* (2006.01)
(52) U.S. Cl.
CPC ...... *G01C 21/3822* (2020.08); *G01C 21/3811* (2020.08)
(58) Field of Classification Search
CPC .......................... G01C 21/3822; G01C 21/3811
See application file for complete search history.

(56) References Cited

U.S. PATENT DOCUMENTS

2014/0141803 A1* 5/2014 Marti ................... G01C 21/206
                                                          455/456.2
2019/0303392 A1* 10/2019 Eade ....................... G06T 7/168
2020/0285658 A1* 9/2020 Wheeler .............. G05D 1/0274

* cited by examiner

*Primary Examiner* — Adnan M Mirza
(74) *Attorney, Agent, or Firm* — Sanders IP Law

(57) ABSTRACT

A method of obtaining a relative identifier corresponding to a request to access element data corresponding to an element depicted by a map of an area, the map being divided into a plurality of tiles, the map having map data corresponding thereto, the plurality of tiles having respective sets of tile data corresponding thereto, and the sets of tile data being subsets of the map data. Further, identifying a particular set of tile data corresponding to a particular tile, the particular set of tile data being identified based at least on a tile identifier included in the relative identifier. The method may additionally include, identifying a location of the element data in the particular tile data based on an element identifier included in the relative identifier. Further, the method may include accessing one or more portions of the element data using the location of the element data as identified.

20 Claims, 10 Drawing Sheets

FIG. 2A

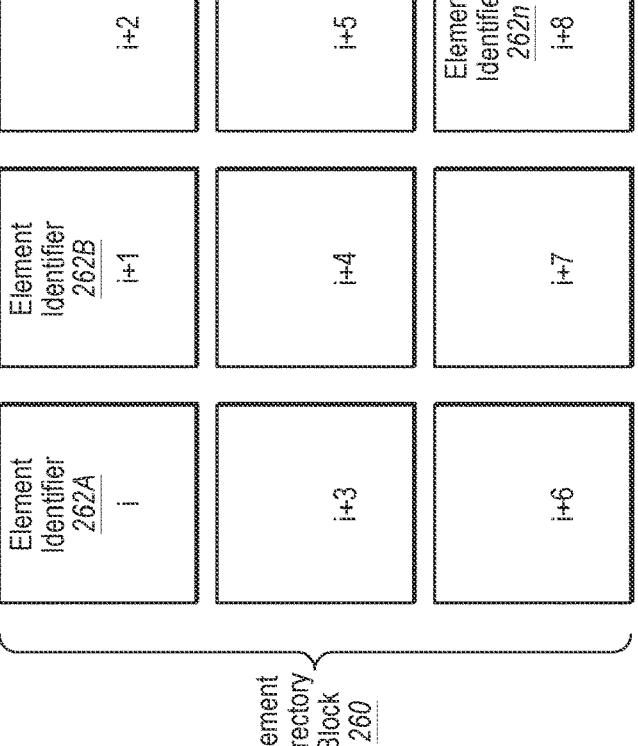
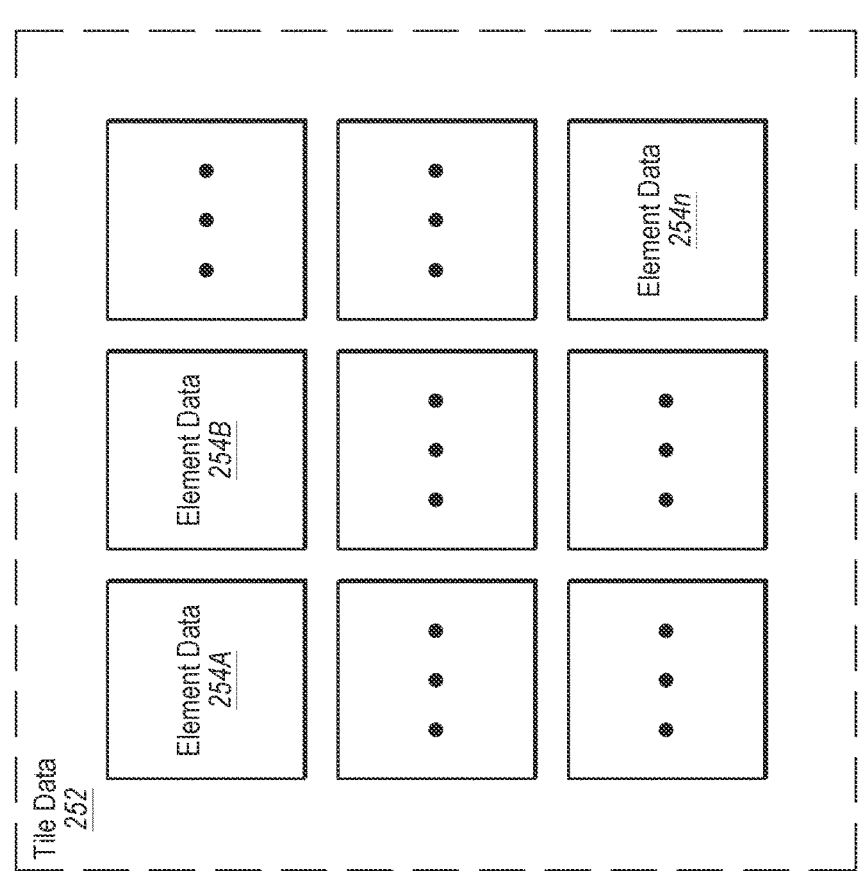
FIG. 2B

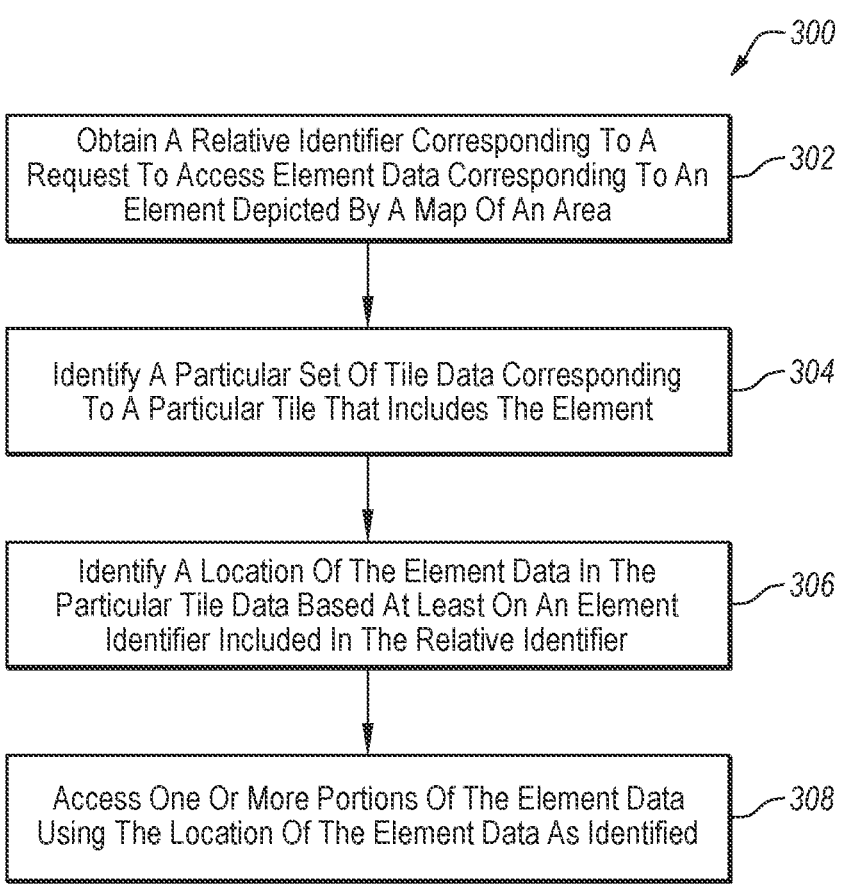

*300*

Obtain A Relative Identifier Corresponding To A Request To Access Element Data Corresponding To An Element Depicted By A Map Of An Area *302*

Identify A Particular Set Of Tile Data Corresponding To A Particular Tile That Includes The Element *304*

Identify A Location Of The Element Data In The Particular Tile Data Based At Least On An Element Identifier Included In The Relative Identifier *306*

Access One Or More Portions Of The Element Data Using The Location Of The Element Data As Identified *308*

Figure 5:
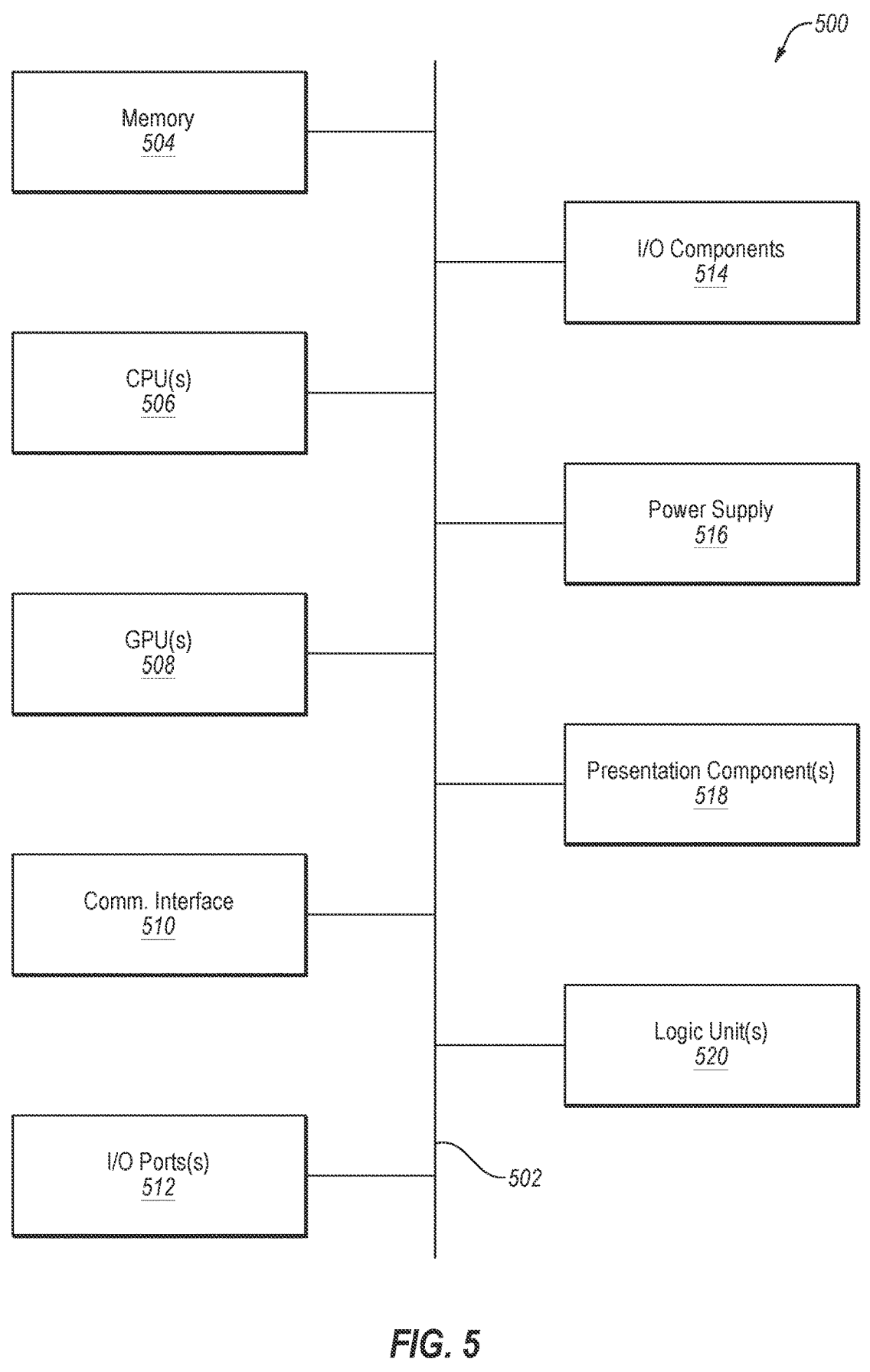

Memory
504

I/O Components
514

CPU(s)
506

Power Supply
516

GPU(s)
508

Presentation Component(s)
518

Comm. Interface
510

Logic Unit(s)
520

I/O Ports(s)
512

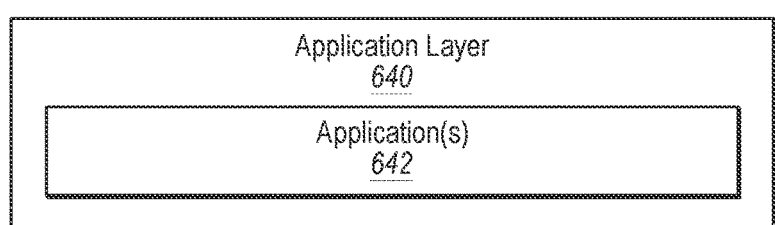
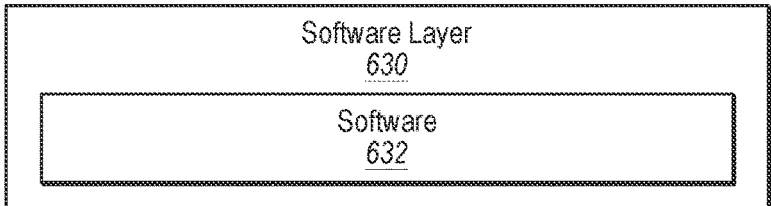
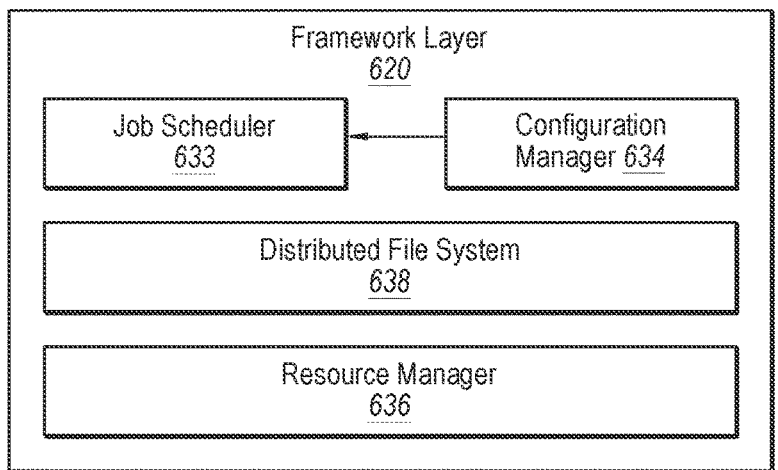
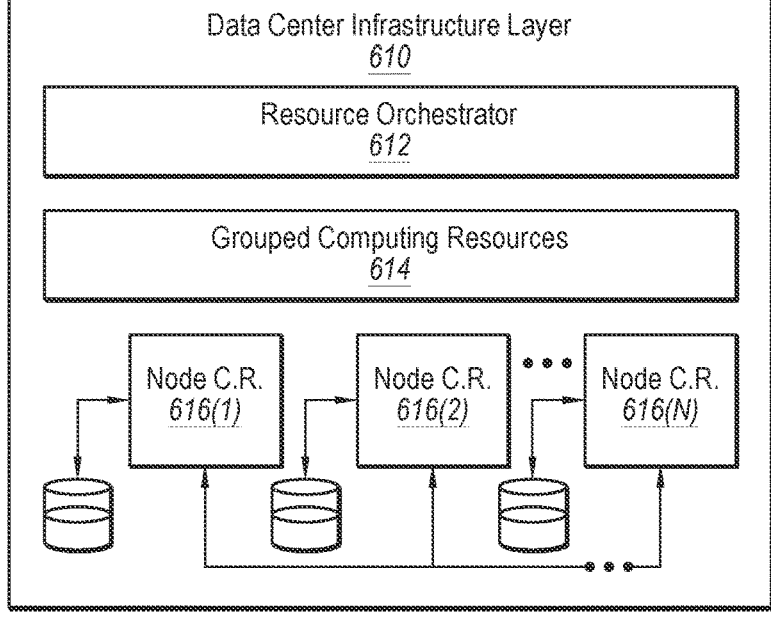
*FIG. 6*

MAP PROCESSING

BACKGROUND

A map of an area (e.g., geographical area, building, etc.) may be generated based on corresponding map data, where the map data may include indications of object locations and/or characteristics corresponding to the area. For example, the map data may include data that corresponds to, by way of example and not limitation, roads (and/or other traversable paths), road signs, buildings, art locations, parks, traffic, sidewalks, road or other surface markings (e.g., lane lines, cross-walk lines, etc.), and/or the like. In some instances, systems may be configured to locate, identify, and/or access map data corresponding to a map of an area to perform one or more tasks.

Some approaches to locating map data may include multiple layers corresponding to the segments (e.g., a road-network layer, a traffic-control layer, a lane-change control layer, etc.). In some instances, the one or more elements corresponding to the one or more layers are expressed in a coordinate system that is local to their segments and, as a result, requires applying a respective coordinate-transform function.

Further, other approaches to locating map information may use global identifiers to access map data corresponding to an element (e.g., "global element identifiers"), where, in some instances, the global element identifiers may include a unique identifier for each element. In many scenarios, the use of global element identifiers increases the amount of data (e.g., the number of bits) required to access a referenced element—e.g., 128 bits. Furthermore, some existing approaches to identifying and/or locating map data corresponding to particular elements may require a substantial amount of pre-processing where significant parts of the map data are loaded onto memory and organized into one or more data structures used for map data access. For example, global element identifiers may be mapped onto a hash-map, in-memory representation of the elements corresponding to map data. As a result, locating elements using global element identifiers in maps including a large amount of map data may not be a feasible solution—particularly for ego machines (e.g., semi-autonomous and/or autonomous vehicles or machines) seeking quick and accurate access to map data for performing real-time or near real-time navigation operations.

SUMMARY

According to one or more embodiments of the present disclosure, a relative identifier may be obtained, where the relative identifier may correspond to a request to access element data. In some embodiments, the element data may correspond to an element represented using a map of an area. Further, the map may be divided into one or more tiles that may have map data corresponding thereto. In some embodiments, the one or more tiles may have respective sets of tile data corresponding thereto, where the sets of tile data may be subsets of the map data corresponding to the map.

Continuing the example, a particular set of tile data may be identified, where the particular set of tile data may correspond to a particular tile that may include the element. In some embodiments, the particular set of tile data may be identified based at least on a tile identifier that may be included in the relative identifier. In some embodiments, the tile identifier may identify the particular tile in reference to a reference tile of the one or more tiles.

Further continuing the example, a location of the element data in the particular tile data may be identified. In some embodiments, the location of the element data may be identified based at least on an element identifier included in the relative identifier. In some embodiments, the element identifier may indicate the location of the element data based at least on a local reference frame that may correspond to the particular tile data. In some embodiments, one or more portions of the element data may be accessed using the location of the element data as identified.

The embodiments of the present disclosure may help to access map data corresponding to elements of interest within a map in a manner that may increase efficiency and decrease an amount of memory used to access the map data. For example, some traditional approaches to organizing and/or locating particular map data may include using map data organized into segments corresponding to a map. Continuing the example, the segments may include map data, a respective origin point that may be expressed in an Earth-centered coordinate system—e.g., World Geodetic System (WGS84) coordinates, and one or more respective elements. Further, some traditional approaches include multiple layers corresponding to the segments (e.g., a road-network layer, a traffic-control layer, a lane-change control layer, etc.). In some traditional approaches, the one or more elements corresponding to the one or more layers are expressed in a coordinate system that is local to their segments and, as a result, requires the application of a respective coordinate-transform function.

The embodiments of the present disclosure may access element data corresponding to one or more objects of interest corresponding to map data more quickly and efficiently than traditional approaches. For example, one or more embodiments of the present disclosure may include using a relative identifier to identify and/or access an element associated with map data corresponding to an object of interest within a map. In these and other embodiments, the relative identifier may refer to a description of a specific element by using a tile identifier and an element identifier. The tile identifier may reference a tile corresponding to the specific element, and the element identifier may indicate the location of element data corresponding to the tile data referenced using the tile identifier. In these and other embodiments, the use of local element identifiers and relative tile identifiers may decrease memory used to store element identifiers, tile-data pre-processing, and may include performance comparable to an in-memory pointer-based representation. Furthermore, the use of local element identifiers and relative tile identifiers may eliminate and/or mitigate the need for substantial pre-processing to access map data.

BRIEF DESCRIPTION OF THE DRAWINGS

The present systems and methods for accessing element data corresponding to elements in a map are described in detail below with reference to the attached drawing, wherein:

FIG. 2A illustrates an example environment corresponding to a map including one or more tiles identified using one or more relative tile identifiers and that may be assigned one or more pointers, in accordance with one or more embodiments of the present disclosure;

FIG. 2B illustrates an example environment related to identifying locations of element data associated with one or more elements depicted in the map of FIG. 2A, in accordance with one or more embodiments of the present disclosure;

FIG. 3 is a flow diagram showing a method of locating an element corresponding to map data, in accordance with one or more embodiments of the present disclosure;

FIG. 5 is a block diagram of an example computing device suitable for use in implementing one or more embodiments of the present disclosure; and FIG. 6 is a block diagram of an example data center suitable for use in implementing one or more embodiments of the present disclosure.

DETAILED DESCRIPTION

Figure 1:
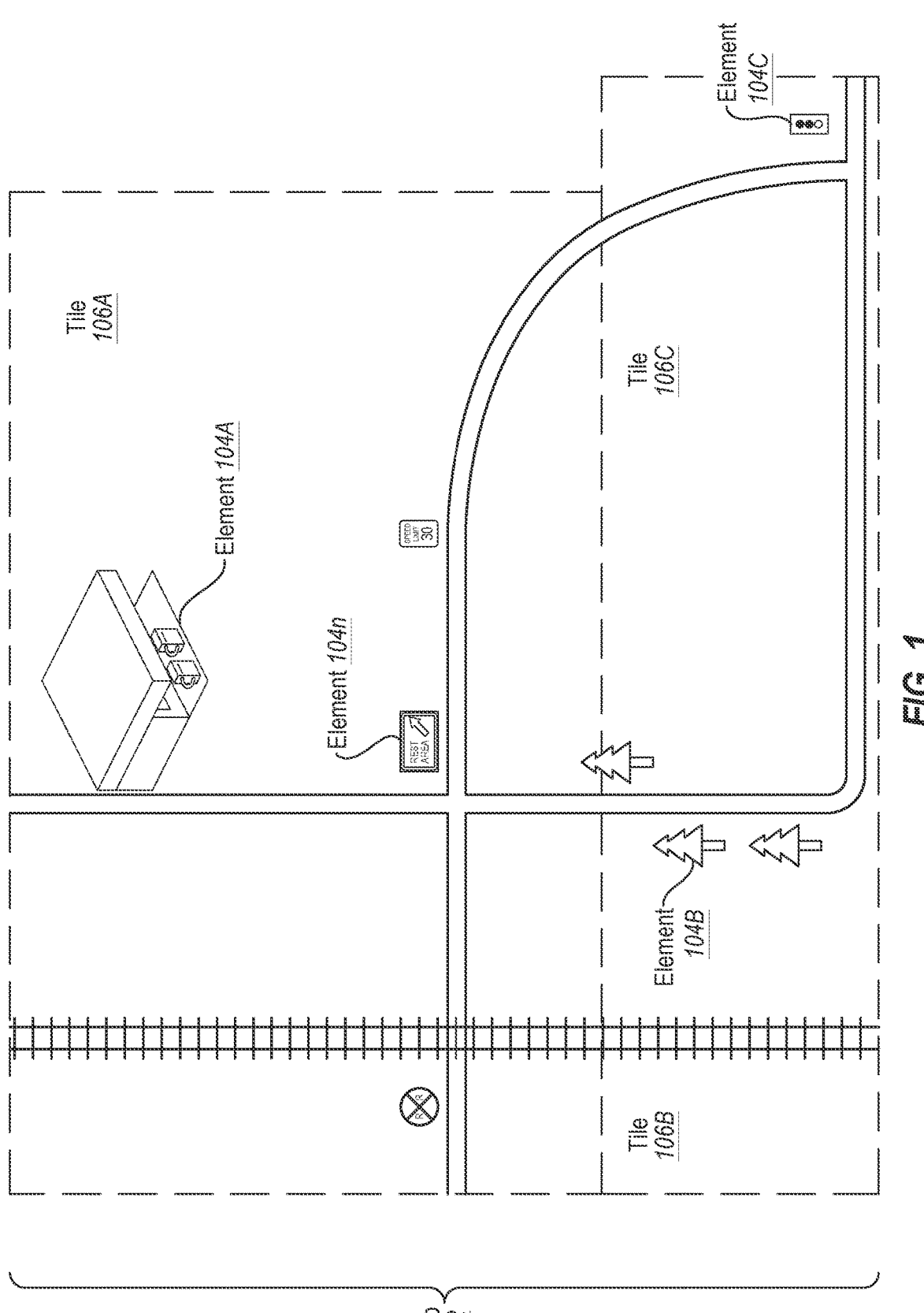
FIG. 1 illustrates an example map that may be divided into one or more tiles and may include one or more elements, in accordance with one or more embodiments of the present disclosure.

One or more embodiments of the present disclosure may relate to locating and/or identifying one or more elements corresponding to map data using a relative identifier. As used in the present disclosure, a "relative identifier" may refer to an indication as to how to locate element data corresponding to respective elements. As detailed below, the relative identifiers may reference tiles (e.g., by way of respective "tile identifiers" included in the respective relative identifiers). The referenced tiles may have corresponding tile data that includes element data corresponding to the respective elements. Additionally or alternatively, the tile identifiers may reference the tiles that have corresponding element data in relation to another tile—e.g., "a reference tile" or a "home tile." Further, in some embodiments, the relative identifiers may include corresponding index values that may indicate the respective locations in the tile data of the respective element data corresponding to the elements (e.g., which array field of the tile data the specific element may be located). In some embodiments, the index value may be referred to or be an example of an "element identifier."

In some embodiments, the relative identifier may reference one or more tiles corresponding to a map where the map has map data corresponding thereto, and the one or more tiles may correspond to tile data associated with the map data. In these and other embodiments, the map may be a representation (e.g., a visual representation) of an area corresponding to the map data, and the map may include one or more objects, locations, geographic markers, etc. In these and other embodiments, one or more areas of the map may be subdivided into one or more tiles.

In some embodiments, the tile identifier may indicate one or more locations of tile data corresponding to one or more tiles corresponding to the map. In some embodiments, the tile identifier may identify a tile in relation to the reference tile. In these and other embodiments, the tile identifier may indicate a location of the tile based on one or more directions of the tile relative to the reference tile and the number of tiles between the tile and the reference tile.

For example, in the context of an ego machine locating map data, the reference tile may correspond to tile data corresponding to one or more locations of the ego machine in the map data corresponding to the map. In some embodiments, the tile identifier corresponding to map data outside of the reference tile may be located and/or identified with respect to the reference tile. Additionally or alternatively, map data including element data corresponding to one or more elements describing one or more objects of interest may be located in tile data corresponding to a tile that is not the reference tile.

In some embodiments, tile data corresponding to one or more tiles may be located and/or identified with respect to tile data corresponding to a reference tile. Additionally or alternatively, element data corresponding to an element located within the tile data corresponding to the identified tile may be located and/or identified using an index of one or more fields within an array organizing tile data corresponding to the identified tile.

In some embodiments, the element identifier may indicate one or more locations of element data corresponding to one or more elements in the tile data. In these or other embodiments, the element identifier may indicate the element data based on a local reference frame corresponding to the tile data. In these and other embodiments, the local reference frame may include one or more data structures corresponding to tile data where the one or more data structures may include map data corresponding to one or more elements located in the tile data. For example, the tile data being referenced may include an array including one or more entries indicating respective locations of element data corresponding to one or more elements. Continuing the example, referencing a particular entry in the array may be referencing element data based on the local reference frame of the particular tile.

One or more of the embodiments disclosed herein may relate to using a relative identifier to locate and/or identify element data corresponding to an element as a part of one or more ego-machines, which may include any applicable machine or system that is capable of performing one or more autonomous and/or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous vehicle or machine 400 (alternatively referred to herein as "vehicle 400" or "ego-machine 400") described with respect to FIGS. 4A-4D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as one or more large language models (LLMs) that may process text, audio, and/or image/sensor data to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

The embodiments of the present disclosure may help to locate and/or identify element data corresponding to one or more elements of interest within map data corresponding to a map in a manner that may increase efficiency and decrease an amount of memory used to locate the element data. For example, some traditional approaches to organizing, locating, and/or identifying element data may include using map data organized into segments corresponding to a map. Continuing the example, the segments may include map data, a respective origin point that may be expressed in an Earth-centered coordinate system—e.g., World Geodetic System (WGS84) coordinates, and element data corresponding to one or more respective elements. Further, some traditional approaches include multiple layers corresponding to the segments (e.g., a road-network layer, a traffic-control layer, a lane-change control layer, etc.). In some traditional approaches, the one or more elements corresponding to the one or more layers are expressed in a coordinate system that is local to their segments and, as a result, require the application of a respective coordinate-transform function.

In addition, some traditional approaches may use global identifiers to locate element data corresponding to an element (e.g., "global element identifiers"). The global element identifiers may include a unique identifier that may correspond to a location of element data corresponding to an element located in the map data for each element. In many instances, the use of global element identifiers increases the amount of data (e.g., the number of bits) required to locate element data corresponding to a referenced element—e.g., 128 bits.

Furthermore, some existing approaches to locating and/or identifying map data corresponding to particular elements may require a substantial amount of pre-processing where significant parts of the map data are loaded onto memory and organized into one or more data structures used to locate map data. For example, global element identifiers may be mapped onto a hash-map, in-memory representation of element data corresponding to the elements corresponding to map data. As a result, locating and/or identifying element data corresponding to one or more elements using global element identifiers in maps including a large amount of map data may not be a feasible solution particularly for ego machines and/or autonomous vehicles seeking quick and accurate access to map data.

By contrast, the embodiments of the present disclosure may locate and/or identify one or more objects of interest corresponding to map data more quickly and efficiently than other, traditional approaches. For example, one or more embodiments of the present disclosure may be such that a relative identifier may be used to identify and/or locate element data corresponding to an element associated with map data corresponding to an object of interest within a map. In these and other embodiments, the relative identifier may refer to an indication of how to locate element data corresponding to one or more elements.

In some embodiments, the relative identifier may include a tile identifier, indicating the location of tile data corresponding to a tile where the tile data may additionally include element data corresponding to the one or more elements. In these and other embodiments, the relative identifier may additionally include an element identifier indicating a location of element data corresponding to one or more elements within the tile data. In these and other embodiments, the use of relative identifiers may include a decrease in memory used to store global element identifiers, tile-data pre-processing, and may include performance comparable to an in-memory pointer-based representation. Furthermore, the use of relative identifiers may eliminate and/or mitigate the need for substantial pre-processing to locate data of interest within map data corresponding to a map.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

With respect to FIG. 1, FIG. 1 illustrates an example map 102 that may be divided into one or more tiles (referred to collectively as the "tiles 106") and where the map 102 may include one or more elements (referred to collectively as the "elements 104"), in accordance with one or more embodiments of the present disclosure.

The map 102 may include a visual representation of an area. In these and other embodiments, the map 102 may include a visual representation of, for example, a city, a town, a building, a complex, one or more portions of the foregoing, and/or other areas that may be displayed using the map 102.

In some embodiments, the particular geographic area shown and/or illustrated by the map 102 may be generated and/or displayed using one or more computing devices. In some embodiments, the one or more computing devices may be configured to perform one or more operations on the map data to generate the map 102. In these and other embodiments, the one or more computing devices configured to generate and/or display the map 102 may include computing devices described and illustrated in the present disclosure, such as, for example, with respect to FIGS. 4A-4D, 5, and/or 6.

In some embodiments, the map 102 may be generated based on corresponding map data, where the corresponding map data may include indications of objects, areas, and/or characteristics of interest corresponding to the area such that the map 102 may represent the area. For example, the map data may include data that corresponds to, by way of example and not limitation, roads, road signs, buildings, art locations, parks, traffic, sidewalks, road markings (e.g., lane lines, cross-walk lines, etc.), etc. As used in the present disclosure, the objects and/or areas of interest may be referred to as "elements." One or more elements as described in the present disclosure may refer to the object and/or area of interest and/or a representation of the object and/or area of interest shown visually in the map 102.

In some embodiments, the map data may include data and/or information corresponding to how and where the one or more elements 104 may be represented. For example, the map data may include information corresponding to one or more elements 104 that may be visually represented on the map 102 as a streetlight. Continuing the example, the visual representation of the streetlight in the map 102 may be generated based on the map data.

In some embodiments, the map 102 may illustrate one or more locations corresponding to the one or more elements 104 in the map 102. In some embodiments, the map data corresponding to the map 102 may include information corresponding to one or more locations of one or more elements 104. For example, the map data may include global positioning system (GPS) coordinates, WGS84 coordinates, etc. In these and other embodiments, the map 102 may illustrate the element in a way that may correspond to the location information included in the map data corresponding to the one or more elements 104.

In some embodiments, the map 102 may illustrate one or more relative locations corresponding to the one or more elements 104 within the map 102. For example, the map data may include information corresponding to a location of railroad tracks and a location of a road. Continuing the example, the map 102 may illustrate the railroad tracks relative to the road based on map data corresponding to the railroad tracks and map data corresponding to the road. Further continuing the example, the railroad tracks may be shown in the map to the left of the road. In the map 102, in this example, the railroad tracks illustrated to the left of the road may represent that the railroad tracks are located west of the road in the area corresponding to the map 102.

In some embodiments, the map 102 may illustrate distances between objects and/or areas of interest. For example, the map 102 may include one or more roads, railroad tracks, gas stations, road signs, streetlights, etc. In some embodiments, the map 102 may illustrate space between the one or more objects of interest, where the space may represent a geographic distance between the one or more objects of interest. For example, the map 102 may illustrate that the gas station is two inches from the railroad tracks. Continuing the example, the two inches of space between the railroad tracks and the gas station may represent a two-mile distance between the two objects in the area corresponding to the map 102. In these and other embodiments, the map 102 may include a digital representation of map data describing the area. In some embodiments, the map 102 may be dynamic in that the map 102 may be zoomed in and/or zoomed out such that distances between elements and space between elements may change in a dynamic fashion.

In some embodiments, the area of the map 102 may be limited based on one or more factors related to one or more systems accessing, displaying, and/or otherwise using the map 102. In some embodiments, the area illustrated by the map 102 may be limited to memory allocation, processing power, processing speed, and/or other factors that may affect the amount of map data that may be processed, stored, or otherwise used corresponding to the map 102.

In some embodiments, the area shown in the map 102 may be limited based on one or more preferences of a user. For example, one or more systems may be configured to use the map 102 where the use of the map 102 may be faster if the amount of map data processed, stored, and/or otherwise used is artificially limited to a smaller area. Additionally or alternatively, the area illustrated by the map 102 may be limited on an arbitrary basis. For example, one or more systems, entities, users, and others may limit the area shown by the map 102 to 100 square meters at any given instance.

In some embodiments, the map 102 may be sub-divided into one or more tiles 106. By way of example and not limitation, the tile 106A may correspond to a first sub area of the map 102, the tile 106B may correspond to a second sub-area of the map 102, and the tile 106C may correspond to a third sub-area of the map 102. In some embodiments, together, the one or more tiles 106 may include all, or substantially all, of the area shown by the map 102.

In some embodiments, the tiles 106 may be generated based on tile data that may include information and/or data corresponding to a sub-area corresponding to the tiles 106. In some embodiments, the tile data may include map data corresponding to a particular sub-area corresponding to one or more of the tiles 106. For example, the tile 106A may be generated based on first tile data corresponding to the first sub-area, the tile 106B may be generated based on second tile data corresponding to the second sub-area, and the tile 106C may be generated based on third tile data corresponding to the third sub-area. In these and other embodiments, the first tile data, the second tile data, and the third tile data may include all, or substantially all, of the map data corresponding to the map 102.

In some embodiments, the tiles 106 may correspond to sub-areas of differing size. In some embodiments, the first sub-area corresponding to the first tile 106A may include an area that is different from the second sub-area corresponding to the second tile 106B and the third sub-area corresponding to the third tile 106C. For example, the map 102 may include a total area of 100 square meters. Continuing the example, the first sub area corresponding to the first tile 106A may include fifty square meters, the second sub area corresponding to the second tile 106B may include 30 square meters and the third tile 106C may include 20 square meters such that the combination of the first sub-area, the second sub-area, and the third sub-area may include all, or substantially all, of the 100 square meters in the map 102.

In some embodiments, the tiles 106 may all correspond to sub-areas of the same size. In some embodiments, the first sub-area corresponding to the first tile 106A, the second sub-area corresponding to the second tile 106B, and the third sub-area corresponding to the third tile 106C may all be the same. For example, the map 102 may include a total area of 90 square meters. Continuing the example, the first sub-area corresponding to the first tile 106A may include 30 square meters, the second sub-area corresponding to the second tile 106B may include 30 square meters, and the third sub-area corresponding to the third tile 106C may include 30 square meters. Further, the combination of the first sub-area corresponding to the first tile 106A, the second sub-area corresponding to the second tile 106B, and the third sub-area corresponding to the third tile 106C, in combination, may include all, or substantially all, of the 90 square meters in the map 102.

In some embodiments, the tiles 106 may each be generated based on differing amounts of tile data, where tile data may include map data corresponding to a sub-area illustrated by the one or more tiles 106. In some embodiments, the first tile 106A may be generated based on a first amount of tile data, the second tile 106B may be generated based on a second amount of tile data, and the third tile 106C may be generated based on a third amount of tile data, where the first amount of tile data, the second amount of tile data, and the third amount of tile data may include different amounts of tile data. Additionally or alternatively, the first amount of tile data, the second amount of tile data, and the third amount of tile data may be the same.

In some embodiments, the tiles 106 may individually include a different number of elements 104. In some embodiments, the first tile 106A may include a first number of elements 104, the second tile 106B may include a second number of elements 104, and the third tile 106C may include a third number of elements 104, where the first number of elements 104, the second number of elements 104, and the third number of elements 104 may be different. Additionally or alternatively, the first number of elements 104, the second number of elements 104, and the third number of elements 104 may be the same. In these and other embodiments, the first number of elements 104, the second number of elements 104, and the third number of elements 104, combined, may include all, or substantially all, of the elements in the map 102.

In some embodiments, the number of tiles corresponding to the map 102 may depend on the elements 104 within the map 102. For example, a first map may include a first number of tiles corresponding to a first number of elements and a second map may include a second number of tiles corresponding to a second number of elements, where the first number of elements is much larger than the second number of elements. Continuing the example, the first number of tiles may be larger than the second number of tiles because the first number of elements is larger than the second number of elements.

The elements 104 may correspond to one or more objects and/or areas of interest in the map 102. In some embodiments, the elements 104 may be generated based on corresponding element data that may be included in the map data corresponding to the map 102. In some embodiments, the first element 104A may correspond to an area and/or object of interest in the first tile 106A, the second element 104B may correspond to an area and/or object of interest in the second tile 106B, the third element 104C may correspond to an area and/or object of interest in the third tile 106C. In some embodiments, the element 104n may include an nth element corresponding to the first tile 106A. In some embodiments, the element 104n may represent an nth number of elements 104 that may correspond to the map 102.

The first element 104A may be generated based on element data that may include data and/or information that may be used to visually represent a gas station in the map 102. In some embodiments, the element data corresponding to the element 104A may include data corresponding to a geographic location of the gas station, data regarding price or items for sale (e.g., weblinks to the gas station's website), information on the company owning the gas station, the gas station's location relative to other objects of interest (e.g., roads, road signals, and other data and/or information corresponding to the element 104A in the map 102).

The second element 104B may be generated based on element data that may include data and/or information that may visually manifest as a wooded area in the map 102. The element data corresponding to the element 104B may include data and/or information corresponding its geographic size, its location relative to other objects within the sub-area corresponding to the second tile 106B, potential trail heads through the wooded area, and other data and/or information corresponding to the wooded area.

The third element 104C may be generated based on element data that may include data and/or information that may visually manifest as a traffic signal in the map 102. In some embodiments, the element data corresponding to the element 104C may include a geographic location of the traffic signal, a location of the traffic signal in relation to other objects and data within the tile 106C and further in relation to other elements in the map 102. For example, the element data corresponding to the element 104C may include information about the type of traffic signal, the current state of the traffic signal (e.g., what light the traffic signal is showing at any given time stamp), traffic corresponding to the traffic signal, and other data and/or information corresponding to the traffic signal.

In some embodiments, the map 102 may include elements 104 up to and including element 104n. The element 104n may be generated based on element data corresponding to what may visually manifest as a street sign in the map 102. Element 104n may be generated based on corresponding data and/or information regarding the content of the traffic sign, the geographic location of the traffic sign in relation to other map data in the map 102 and/or the tile data corresponding to the first tile 106A. In these and other embodiments, the map 102 and/or the tiles 106 may include one or more elements 104 up to and including 104n.

Figure 2A:
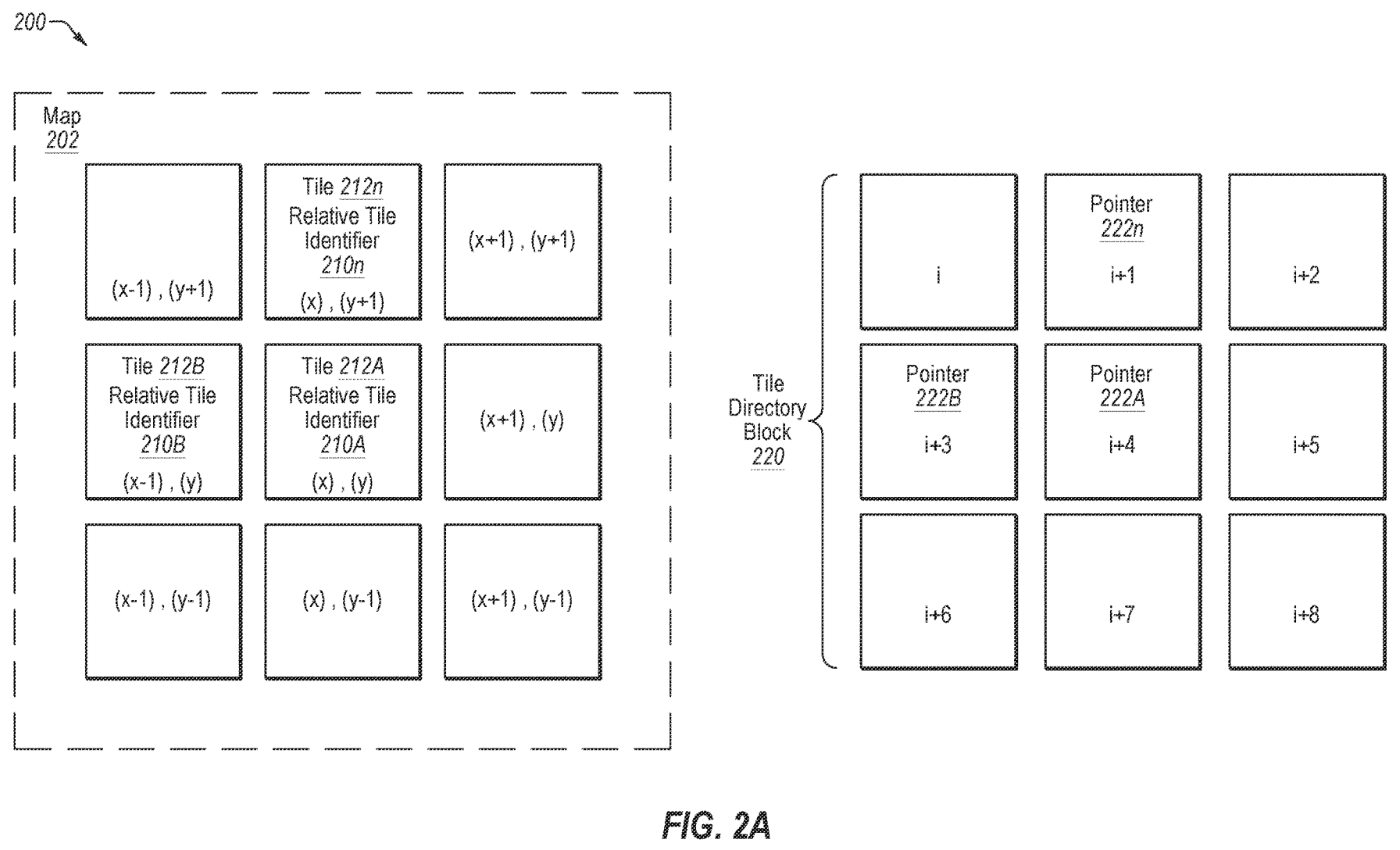

In these and other embodiments, one or more systems may be configured to access and/or identify the map data corresponding to the one or more tiles 106 and/or the one or more corresponding elements 104 using one or more relative identifiers that may include a corresponding tile identifier and element identifier as described and illustrated further in the present disclosure, such as, for example, with respect to FIGS. 2A, 2B, and 3.

FIG. 2A illustrates an example environment 200 corresponding to a map 202 including one or more tiles 212 identified using one or more relative tile identifiers 210 and that may be assigned one or more pointers 222, in accordance with one or more embodiments of the present disclosure. In some embodiments, the environment 200 may include the map 202 that may include a visual representation of an area. In these and other embodiments, the map 202 may be based on map data corresponding to a particular geographic area. In these and other embodiments, the map 202 may include and/or be analogous to the map 102 described further in the present disclosure, such as, for example, with respect to FIG. 1.

In some embodiments, the particular geographic area shown and/or illustrated by the map 202 may be generated and/or displayed using one or more computing devices. In some embodiments, the one or more computing devices may be configured to perform one or more operations on the map data to generate the map 202. In these and other embodiments, the one or more computing devices configured to generate and/or display the map 202 may include computing devices described and illustrated in the present disclosure, such as, for example, with respect to FIGS. 4A-4D, 5, and/or 6.

In some embodiments, the map 202 may include a first tile 212A, a second tile 212B, up to and including an nth tile 212n (referred to collectively as the tiles 212). In these and other embodiments, the tiles 212 may be generated using corresponding tile data that may be included in map data corresponding to the map 202. In some embodiments, the tiles 212 collectively may include all, or substantially all, of the particular area displayed in the map 202. In some embodiments, the tile data corresponding to the tiles 212, in aggregate, may include all, or substantially all, of the map data corresponding to the map 202.

In some embodiments, the tiles 212 may include tile data corresponding to one or more sub-areas in the map 202. For example, the first tile 212A may correspond to a first sub-area of the map 202, the second tile 212B may correspond to a second sub-area of the map 202, up to and including the nth tile 212n that may correspond to an nth tile in the map 202. In some embodiments, the tiles 212 may be analogous to the tiles 106 described in the present disclosure, such as, for example, with respect to FIG. 1. In some embodiments, the tile data corresponding to respective tiles 212 may be identified and/or accessed using one or more relative tile identifiers—e.g., relative tile identifier 210A, relative tile identifier 210B, up to and/or including relative tile identifier 210n (referred to collectively as "relative tile identifiers 210").

In some embodiments, the one or more relative tile identifiers 210 may include data and/or information indicating one or more locations of tile data in the map data corresponding to the map 202 where the map data may correspond to tile data corresponding to one or more tiles 212 in the map 202. For example, the one or more relative tile identifiers 210 may include one or more values that may convey information used to identify the location of tile data corresponding to one or more tiles 212 in the map 202. In these and other embodiments, the one or more values may include one or more data types—e.g., integer, float, string, char, Boolean, or other data type that may convey information corresponding to the identification of the location of tile data corresponding to the tiles 212 corresponding to the map 202. In some embodiments, the one or more values may indicate one or more locations of one or more tiles 212 relative to one or more other tiles 212 corresponding to the map 202.

In some embodiments, the relative tile identifier(s) 210 may identify one or more tiles 212 in relation to a "reference tile" or a "home tile." In these and other embodiments, the reference tile may refer to one of the one or more tiles 212 from which one or more of other tiles 212 may be identified. In some embodiments, the reference tile may correspond to a location of a system identifying one or more tiles 212 in the map 202.

For example, in the context of an ego machine locating map data, the reference tile may correspond to tile data corresponding to one or more locations of the ego machine in the map data corresponding to the map 202. In some embodiments, the reference tile may change depending on a location of the system, user, ego-machine, etc. For example, continuing in the context of an ego machine locating map data, the reference tile may be the tile 212A corresponding to a first location of the ego-machine at a first time stamp. Continuing the example, the ego-machine may move to the tile 212B in a second time stamp and the reference tile may also change to the tile 212B corresponding to the location in the map 202 of the ego-machine at the second time stamp.

In some embodiments, the reference tile may be identified and/or otherwise selected on an arbitrary basis. For example, the reference tile may include one or more of the first tile 212A, the second tile 212B, up to the nth tile 212n.

In some embodiments, the one or more relative tile identifiers 210 may indicate a location of the one or more tiles 212 based on one or more directions of the one or more tiles 212 relative to the reference tile. By way of example and not limitation, as illustrated in FIG. 2A, the directional information may be indicated using variables "x" and "y" which may indicate relative location information corresponding to a two-dimensional map. Variables x and y may be representative of one or more values corresponding to one or more tiles 212 that may indicate relative directional information corresponding to the one or more tiles 212 in relation to the reference tile.

In some embodiments, the reference tile identifier may indicate an origin from which one or more other tiles 212 may be identified and/or accessed. In some embodiments, relative locations may refer to one or more cardinal directions—e.g., North, East, South, West from the one or more relative tiles corresponding to the map 202. By way of example and not limitation, a positive value in the y-direction may identify a tile corresponding to one or more locations north of the reference tile, a negative value may indicate a tile corresponding to one or more locations south of the reference tile. Continuing the example, a positive value in the x-direction may identify a tile that may correspond to one or more locations east of the reference tile, a negative value in the x-direction may identify a tile that may correspond to one or more locations west of the reference tile.

For example, a reference tile (e.g., tile 212A) may include a corresponding relative tile identifier 210A—e.g., "(x), (y)." that may correspond to an origin point or an origin tile from which one or more locations of one or more other tiles 212 may be referenced. Continuing the example, identifying tile data corresponding to tile 212n corresponding to one or more locations north of the reference tile on the map 202 may include a relative tile identifier 210n including directional information—e.g., "(x), (y+1)"—using a positive sign corresponding to an integer "+1" in the y-direction. Further continuing the example, identifying tile 212B corresponding to one or more locations west of the reference tile may be identified using relative tile identifier 210B including directional information in the x-direction—e.g., "(x−1), (y)"—using a negative sign corresponding to an integer "−1" in the x-direction.

In some embodiments, the directional identifiers may be reversed—e.g., relative tile identifier 210B may include "(x+1), (y)" to identify tile 212B corresponding to a location west of tile 212A. In some embodiments, one or more values, signs, data types, and/or other indicators may be used to identify one or more directions corresponding to one or more tiles relative to the reference tile.

Additionally or alternatively, relative tile identifiers 210 may indicate a number of tiles between the one or more tiles 212 and the reference tile. For example, continuing in the context of using tile 212A as the reference tile, tile 212n may include relative tile identifier 210n that may indicate that tile 212n may be one tile corresponding to one or more locations north of the reference tile "(x), (y+1)." Continuing the example, tile data corresponding to tile 212B may be identified using the relative tile identifier 210B that may indicate that tile 212B may be located one tile corresponding to one or more locations west of the reference tile "(x−1), (y)" in the map 202. Continuing the example, another tile that may be located one tile above tile 212$n$ in relation to the reference tile may be identified using relative identifier "(x), (y+2)," identifying two tiles between the reference tile and the tile corresponding to one or more locations north of the tile 212$n$ in the map 202.

In some embodiments, the one or more relative tile identifiers 210 corresponding to one or more respective tiles 212 may be assigned one or more pointers 222 corresponding to a tile directory block 220. In some embodiments, the tile directory block 220 may include one or more data structures onto which one or more pointers 222 corresponding to one of more tile identifiers 210 may be stored.

In some embodiments, the tile directory block 220 may be included in the environment 200 and may include one or more data structures that may be configured as a way to identify and/or access tile data corresponding to one or more tiles in the map 202. In these and other embodiments, the tile directory block 220 may not be included in the map data corresponding to the map 202; rather, the tile directory block 220 may be configured to point to locations of tile data corresponding to one or more tiles 212 and included in map data corresponding to the map 202.

The tile directory block 220 may include an array including one or more entries corresponding to the one or more relative tile identifiers 210 corresponding to one or more tiles 212. In some embodiments, one or more of the entries in the tile directory block 220 may include one or more corresponding pointers 222 that may indicate one or more locations of tile data corresponding to one or more tiles 212. For example, an i$_{th}$ entry in the tile directory block 220 may include a pointer (e.g., pointer 222A) that may correspond to one or more tiles 212 (e.g., tile 212A) and that may point to one or more locations in the tile data corresponding to the one or more tiles 212.

In some embodiments, the one or more pointers 222 may include one or more values that may correspond to and/or be assigned to one or more relative tile identifiers 210. By way of example and not limitation, the tile directory block 220 may include pointer 222A that may correspond to tile 212A such that the relative tile identifier 210A may correspond to "i+4" that may be one or more values corresponding to the pointer 222A. Continuing the example, the tile directory block 220 may include pointer 222B that may include value "i+3" that may correspond to tile 212B. Further, the tile directory block 220 may include pointer 222$n$ that may include value "i+1" that may correspond to tile 212$n$.

In some embodiments, the one or more pointers 222 that may correspond to one or more relative tile identifiers 210 may include information that may point to portions of the tile data that represent one or more sub-areas of the map corresponding to one or more tiles 212. For example, the pointer 222A may point to the portions of the tile data that represent the sub-area of the map corresponding to tile 212A. Continuing the example, the pointer 222B may point to the portions of the tile data that represent the sub-area of the map corresponding to tile 212B, and the pointer 222$n$ may point to the portions of the tile data that represent the sub-area of the map corresponding to tile 212$n$. In these and other embodiments, the one or more pointers 222 included in the tile directory block 220 may allow and/or assist one or more systems to locate tile data corresponding to one or more of the tiles 212.

In some embodiments, one or more systems configured to identify and/or access tile data corresponding to one or more tiles may load tile data corresponding to the one or more tiles 212 corresponding to the map 202 onto one or more locations in memory. In some embodiments, the one or more systems may assign one or more pointers 222 to the loaded tile data corresponding to the tiles 212 on the tile directory block 220. In some embodiments, the tile data corresponding to one or more of the loaded tiles—e.g., tiles 212—may be loaded onto one or more locations in memory and each of the tiles 212 may be assigned a corresponding pointer—e.g., the one or more pointers 222.

In some embodiments, one or more tiles 212 may not be loaded onto one or more memory locations in the one or more systems. In these and other embodiments, the one or more tiles 212 that are not loaded to or are unloaded from one or more memory locations corresponding to the one or more systems may be assigned a pointer set to null.

In some embodiments, one or more systems configured to use the relative tile identifiers 210 to identify and/or access tile data corresponding to one or more tiles 212 may reduce memory allocation for identifying one or more tiles and/or increase processing speed associated with identifying one or more tiles 212 corresponding to the map 202 as compared to a system identifying and/or accessing one or more tiles 212 using global tile identifiers.

By contrast, in some other traditional approaches, the use of a global tile identifier to identify tile data corresponding to tiles associated with a map may include the use of a unique value corresponding to one or more tiles. For example, some traditional approaches to organizing and/or accessing particular map data may include using map data organized into segments corresponding to a map. Continuing the example, the segments may include map data, a respective origin point that may be expressed in an Earth-centered coordinate system—e.g., World Geodetic System (WGS84) coordinates, and one or more respective tiles. Further, some traditional approaches include multiple layers corresponding to the segments (e.g., a road-network layer, a traffic-control layer, a lane-change control layer, etc.). In some traditional approaches, the one or more tiles corresponding to the one or more layers are expressed in a coordinate system that is local to their segments and, as a result, require the application of a respective coordinate-transform function.

In some traditional approaches, because global tile identifiers may be unique and because global tile identifiers may include data and/or information corresponding to one or more segments and one or more potentially different coordinate systems, the amount of data used in a global identifier may use significantly more data than the data used to identify one or more tiles using a relative tile identifier. For example, some global tile identifiers may identify one or more tiles using 32-bit tile identifiers whereas, some embodiments described in the present disclosure may identify one or more tiles 212 using one or more relative tile identifiers 210 where the one or more relative tile identifiers 210 may include a 4-bit tile identifier. The decrease in data used to identify one or more tiles 212 may decrease the amount of memory and/or processing power associated with identifying one or more tiles 212 as compared to other approaches.

FIG. 2B illustrates an example environment 250 related to identifying locations of element data 254 associated with one or more elements depicted in the map 202 of FIG. 2A, in accordance with one or more embodiments of the present disclosure. In the illustrated example, the element data 254 may be included in tile data 252 that may correspond to a particular tile 212 of the map 202 of FIG. 2A.

In some embodiments, one or more elements depicted in the map 202 of FIG. 2A may correspond to element data 254. For example, a first element may correspond to element data 254A, a second element may correspond to element data 254B, up to and including an nth element that may correspond to element data 254n. In some embodiments, the element data 254, in aggregate, may include all, or substantially all of the elements corresponding to the tile corresponding to the tile data 252.

In some embodiments, the element data 254 may include information and/or data corresponding to one or more objects and/or characteristics of interest. In some embodiments, the element data 254A may correspond to a first object and/or characteristic of interest, the element data 254B may correspond to a second object and/or characteristic of interest, up to and including the element data 254n that may correspond to an nth object and/or characteristic of interest.

For example, the element data 254A may correspond to a street sign. Continuing the example, the element data 254A may include data and/or information that may include a location corresponding to the street sign, the content of the street sign, the location of one or more other objects of interest in relation to the street sign, and/or other data and/or information corresponding to the street sign. In these and other embodiments, the element data 254 may correspond to one or more elements described and/or illustrated in the present disclosure, such as, for example, with respect to FIGS. 1 and 2A.

In some embodiments, element data 254 included in the tile data 252 corresponding to one or more elements may be stored in one or more data structures. In some embodiments, the one or more data structures may include one or more arrays, lists, records, and/or other suitable data structures configured to store element data 254. In some embodiments, the one or more data structures may provide a way to organize and/or manage the element data 254 as well as a mechanism with which one or more systems may identify, locate, and/or access the element data 254 corresponding to specific elements. In some embodiments, element data 254 corresponding to one or more particular elements in the map 202 may be assigned one or more element identifiers 262 included in an element directory block 260.

In some embodiments, the element directory block 260 may be included in the environment 250 and may include one or more data structures that may be configured to provide a way to identify and/or access element data 254 corresponding to one or more elements in the map 202. In some embodiments, the element directory block 260 may include one or more data structures onto which one or more element identifiers 262 may be stored. In some embodiments, the element directory block 260 may include one or more entries in, for example, an array where data and/or information may be stored. In some embodiments, the data and/or information stored in the element directory block may point to one or more portions in element data 254 corresponding to one or more elements associated with the map 202. In these and other embodiments, the one or more entries may include one or more element identifiers 262.

In these and other embodiments, the element directory block 260 may not be included in the map data corresponding to the map 202; rather, the element directory block 260 may include one or more element identifiers 262 that may point to locations of element data 254 corresponding to one or more elements included in the map 202. For example, entry "i" in the element directory block 260 may include the element identifier 262A that may point to the location of element data 254A in tile data 252 where element data 254A corresponds to the first element in the map 202.

The one or more element identifiers 262 may include data and/or information that may point to the portions of the element data 254 that represent the element corresponding to the map 202. For example, element identifier 262A may point to the portions of the element data 254 corresponding to element data 254A that represent the first element corresponding to the map 202. The element identifier 262B may point to the portions of the element data 254 corresponding to element data 254B that represents the second element corresponding to the map 202. Continuing the example, up to and including element identifier 262n that may point to the portions of the element data 254 corresponding to element data 254n that represents the nth element corresponding to the map 202.

In some embodiments, the element identifier 262 may provide an indication as to where one or more systems may access element data 254 corresponding to one or more elements within the tile data 252 corresponding to the map 202. By way of example and not limitation, an autonomous vehicle may be driving in a particular area that may be shown on the map 202. The map 202 may correspond to map data that may be subdivided into tile data (e.g., tile data 252) corresponding to one or more sub areas of the map 202. Continuing the example, the autonomous vehicle may use a relative identifier to access both the tile data 252 and the element data 254A. The relative identifier may include a tile identifier "(x), (y)" that may point to one or more locations in tile data corresponding to tile data 252, such as described, for example with respect to FIG. 2A. Further, the relative identifier may include an element identifier "i" that, used in conjunction with the tile identifier "(x), (y)," may point to a location of element data 254A within tile data 252. The element data 254A may include data corresponding, for example, to a restaurant—e.g., location information websites, hours, and other data and/or information corresponding to the restaurant.

In some embodiments, one or more systems configured to use the element identifiers 262 to identify and/or access element data 254 corresponding to one or more elements may reduce memory allocation for identifying one or more elements and/or increase processing speed associated with identifying and/or accessing element data 254 corresponding to one or more elements corresponding to a map as compared to a system identifying and/or accessing element data 254 using global element identifiers.

By contrast, in some other traditional approaches, the use of a global element identifier to identify element data corresponding to a map may include the use of a unique value corresponding to one or more elements. In some traditional approaches, accessing or locating element data based on a global element identifier may be achieved using both a global tile identifier to obtain a location corresponding to tile data associated with element data corresponding to the element. Further, a global element identifier may additionally be used to identify one or more locations in the tile data corresponding to the element data. For example, the global tile identifier may identify one or more tiles using 32-bit tile identifiers as described further in the present disclosure, such as, for example, with respect to FIG. 2A. Continuing the example, the one or more element identifiers may identify one or more corresponding elements using one or more unique 128-bit global element identifiers.

Furthermore, some other traditional approaches to identifying and/or locating map data corresponding to particular elements may require a substantial amount of pre-processing where significant parts of the map data are loaded onto memory and organized into one or more data structures used for map data access. For example, global element identifiers may be mapped onto a hash-map, in-memory representation of the elements corresponding to map data. As a result, locating elements using global element identifiers in maps including a large amount of map data may not be a feasible solution particularly for ego machines and/or autonomous vehicles seeking quick and accurate access to map data.

In contrast, for example, some embodiments described in the present disclosure may identify locations of element data 254 corresponding to one or more elements in one or more tiles corresponding to tile data 252 using one or more relative tile identifiers (e.g., relative tile identifiers 210) that may include a 32-bit relative identifier including both a relative tile identifier (e.g., relative tile identifiers 210) and one or more element identifiers 262. The decrease in data used to identify element data 254 may decrease the amount of memory and/or processing power associated with identifying element data 254 as compared to other approaches.

Furthermore, the use of relative identifiers may include a decrease in memory used to store global element identifiers, tile-data pre-processing, and may include performance comparable to an in-memory pointer-based representation. Additionally or alternatively, the use of relative identifiers may eliminate and/or decrease the need for substantial pre-processing to locate data of interest within map data corresponding to a map.

FIG. 3 is a flow diagram showing a method 300 of locating an element corresponding to map data, in accordance with one or more embodiments of the present disclosure. One or more operations of the method 300 may be performed by and/or using any suitable system, apparatus, or device, such as, for example, the autonomous vehicle system(s) described with respect to FIGS. 4A-4D, computing device(s) described with respect to FIG. 5, and/or the data system(s) described with respect to FIG. 6 in the present disclosure.

The method 300 may include one or more blocks 302, 304, 306, and 308. Although illustrated with discrete blocks, the operations associated with one or more of the blocks of the method 300 may be divided into additional blocks, combined into fewer blocks, or eliminated, depending on the particular implementation.

In some embodiments, the method 300 may include block 302. At block 302, a relative identifier may be obtained. In some embodiments, the relative identifier may correspond to a request to access element data that may correspond to an element. In these and other embodiments, the element may be depicted by a map of an area. In some embodiments, the map may be divided into one or more tiles, where the map may have map data corresponding thereto. Further, the one or more tiles may have one or more respective sets of tile data that may correspond to the one or more tiles. In some embodiments, the one or more sets of tile data may be subsets of the map data corresponding to the map. In these and other embodiments, the relative identifier and corresponding tiles, tile data, elements, and element data, may be described and/or illustrated further in the present disclosure, such as, for example, with respect to FIGS. 1, 2A, and 2B.

At block 304, a particular set of tile data may be identified. In some embodiments, the particular set of tile data may correspond to a particular tile where the particular tile may include the element. In some embodiments, the particular set of tile data may be identified based at least on a tile identifier that may be included in the relative identifier. In some embodiments, the tile identifier may identify the particular tile in reference to a reference tile of the one or more tiles. In these and other embodiments, identifying the particular set of tile data may be described and/or illustrated with respect to the present disclosure, such as, for example, with respect to FIG. 2A.

At block 306, a location of the element data in the particular tile data may be identified. In some embodiments, the location of the element data may be identified based at least on an element identifier that may be included in the relative identifier. In some embodiments, the element identifier may indicate the location of the element data based at least on a local reference frame that may correspond to the particular tile data. In some embodiments, locating and/or identifying element data in the particular tile data may be described and/or illustrated further in the present disclosure, such as, for example, with respect to FIGS. 1 and 2B.

At block 308, one or more portions of the element data may be accessed. In some embodiments, the one or more portions of the element data may be accessed using the location of the element data as identified. In these and other embodiments, identifying one or more portions of element data may be discussed and illustrated further in the present disclosure, such as, for example, with respect to FIG. 2B.

Modifications, additions, or omissions may be made to one or more operations included in the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 4A:
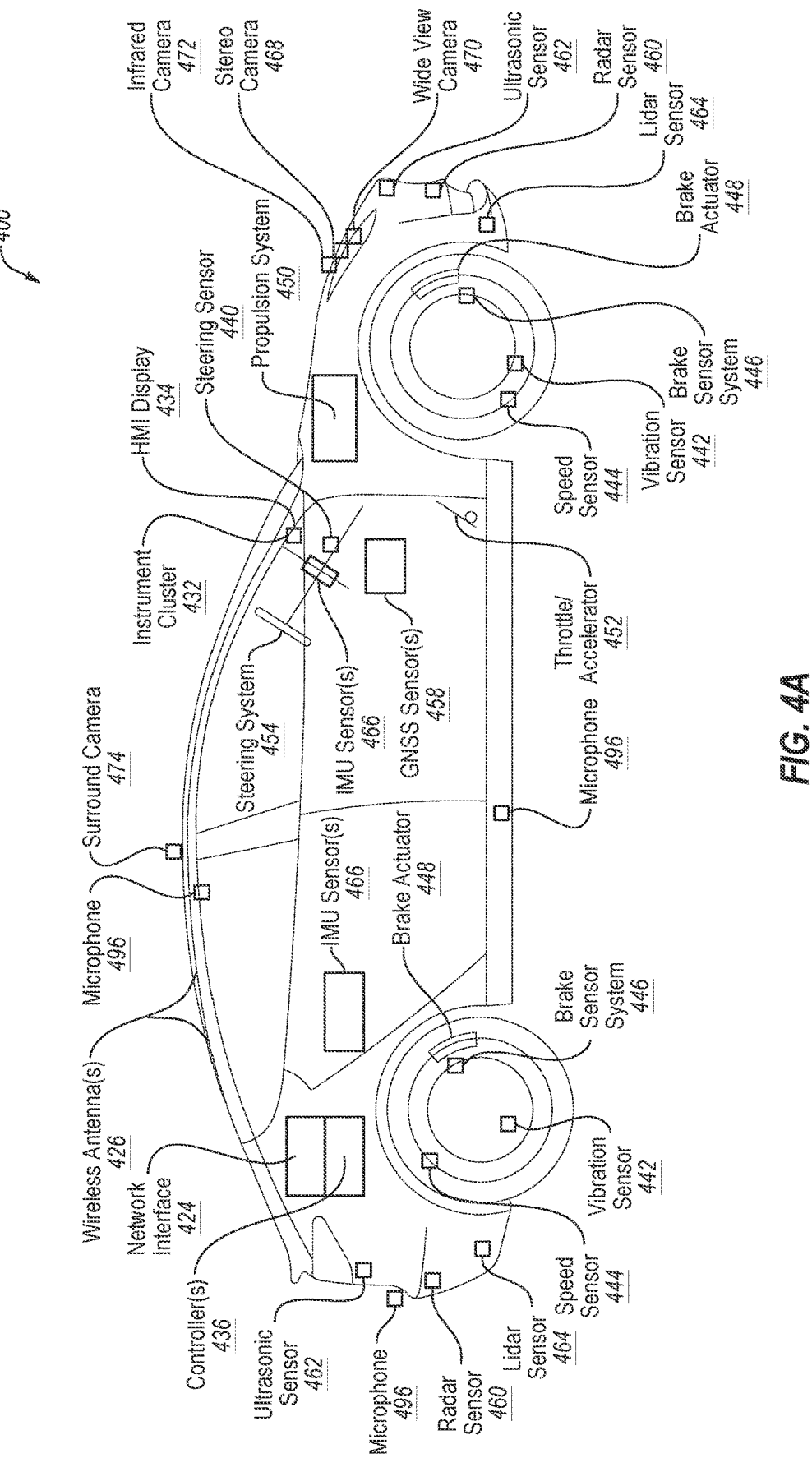
FIG. 4A is an illustration of an example autonomous vehicle, in accordance with one or more embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s)) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the vehicle's 400 location, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424 which may use one or more wireless antenna(s) 415 and/or modem(s) to communicate over one or more networks. For example, the network interface 424 may be capable of communication over LTE, WCDMA, UMTS, GSM, CDMA2000, etc. The wireless antenna(s) 415 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
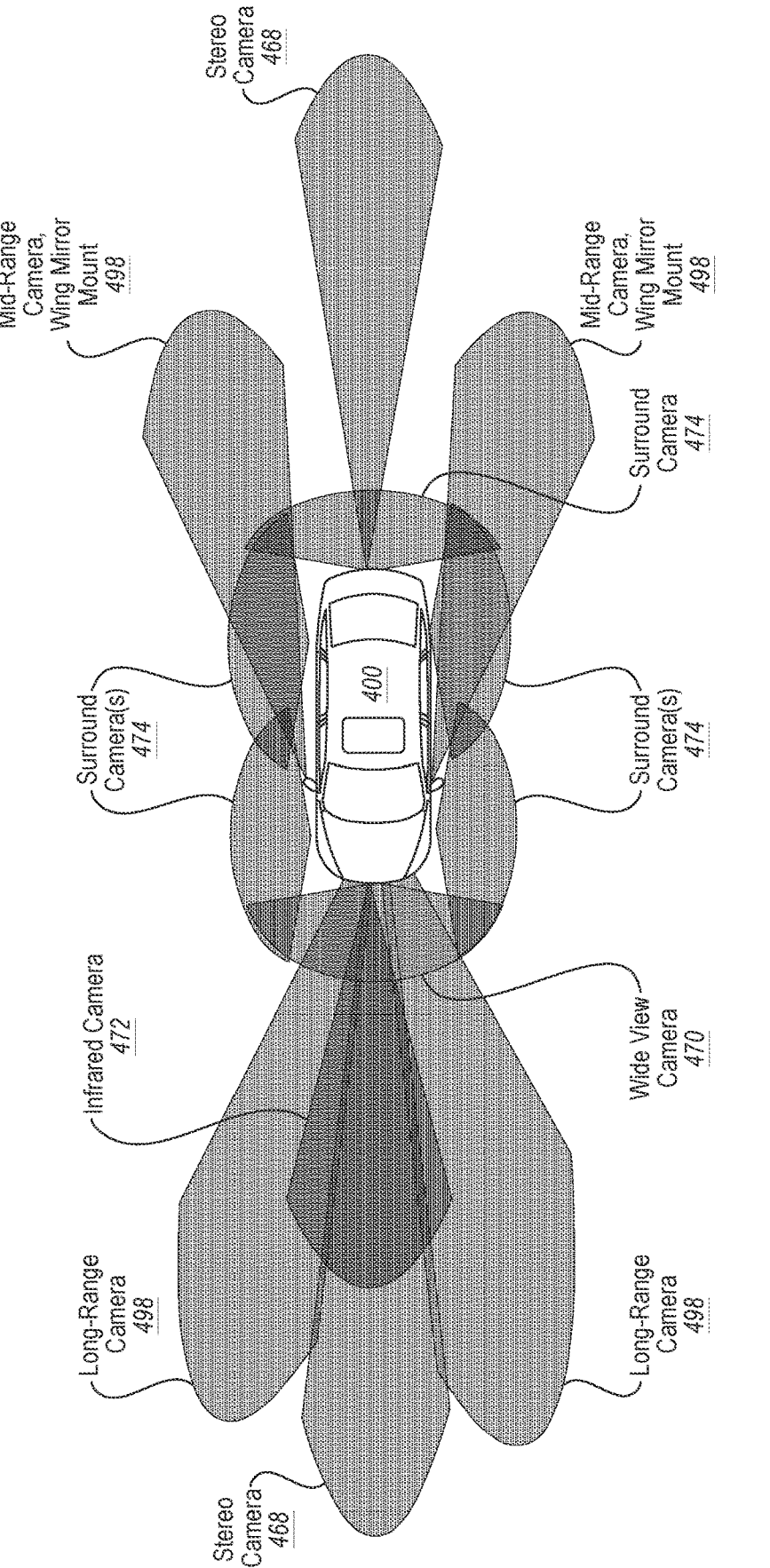
FIG. 4B is an example of camera locations and fields of view for the example autonomous vehicle of FIG. 4A, in accordance with one or more embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360 degree camera(s), and/or the like. Four example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
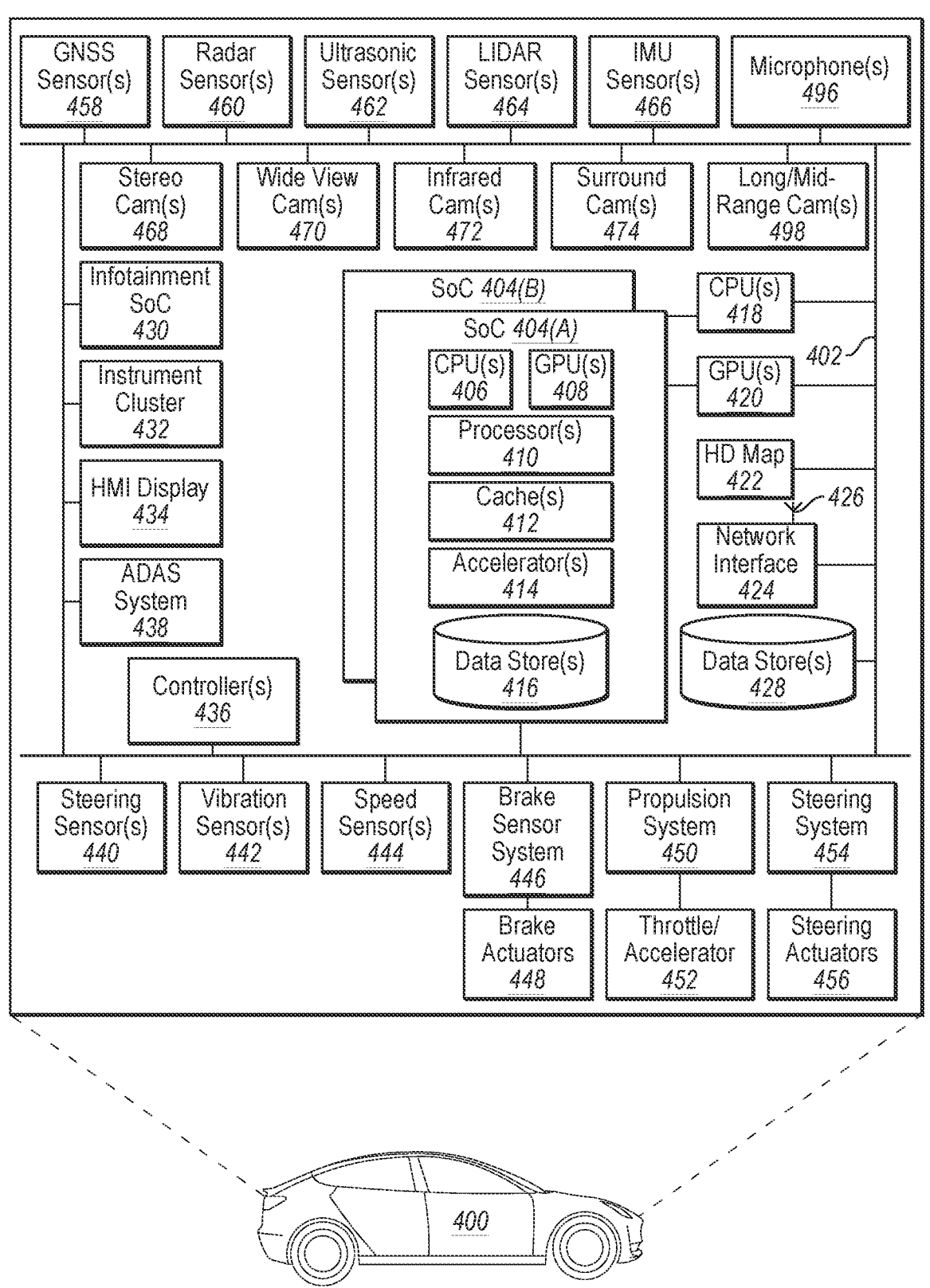
FIG. 4C is a block diagram of an example system architecture for the example autonomous vehicle of FIG. 4A, in accordance with one or more embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C are illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions.

The controller(s) 436 may be coupled to any of the various other components and systems of the vehicle 400, and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system.

For example, the SoC(s) 404 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 412 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high-dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 415 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428 which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPS (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 140 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surroundings at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 1400 m, with an accuracy of 2 cm-3 cm, and with support for a 1400 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high performance GPS-Aided Inertial Navigation System (GPS/INS) that combines microelectro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 415 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly.

However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network which is trained and thus reduces the risk of false positives, as described herein.

The vehicle 400 may further include the infotainment SoC 430 (e.g., an in-vehicle infotainment system (IVI)). Although illustrated and described as a SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 400. For example, the infotainment SoC 430 may radios, disk players, navigation systems, video players, USB and Bluetooth connectivity, carputers, in-car entertainment, Wi-Fi, steering wheel audio controls, hands free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
FIG. 4D is a system diagram for communication between cloud-based server(s) and the example autonomous vehicle of FIG. 4A, in accordance with one or more embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road-work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device,"

"game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

FIG. 6 illustrates an example data center 600 that may be used in at least one embodiments of the present disclosure.

The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616 (N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   obtaining a relative identifier corresponding to a request to access element data corresponding to an element associated with a map of an area, the map being divided into a plurality of tiles and map data corresponding to the map including sets of tile data individually corresponding to the plurality of tiles, wherein:

the relative identifier includes a tile identifier identifying a particular set of tile data corresponding to a particular tile in relation to a reference tile of the plurality of tiles;

the particular tile includes the element;

the tile identifier has one or more pointers of a tile directory block assigned thereto;

using the reference tile, the one or more pointers point to a location in the map data of the particular set of tile data corresponding to the particular tile;

the tile directory block is separate from the map data; and the relative identifier includes an element identifier corresponding to the element and associated element data;

identifying, based at least on the one or more pointers, a location in the map data of the particular set of tile data corresponding to the particular tile i;

identifying a location of the element data in the particular set of tile data based at least on the element identifier, the element identifier indicating the location of the element data in the particular set of tile data based at least on a local reference frame corresponding to the particular set of tile data; and accessing one or more portions of the element data using the location of the element data as identified, wherein an autonomous or semi-autonomous machine performs one or more navigation operations based at least on the one or more portions of the element data as accessed.

2. The method of claim 1, wherein:

the directory block includes an element pointer corresponding to the element identifier;

the element pointer points to the location of the element data in the particular set of tile data using the local reference frame; and the identifying the location of the element data is based at least on using the element pointer.

3. The method of claim 1, wherein:

the particular tile includes a plurality of elements;

one or more of the plurality of elements has an individual element identifier corresponding thereto; and the directory block includes an associated pointer corresponding to an individual indexed field in the one or more indexed fields in the directory block.

4. The method of claim 1, wherein the element data corresponds to one or more objects or characteristics of interest.

5. The method of claim 1, wherein the element data describes at least one of a street sign, an intersection, a streetlight, a traffic signal, a crosswalk, a road marking, a traffic calming device, a roundabout, a building, a restaurant, a traffic hazard, or a scenic point.

6. The method of claim 1, wherein the reference tile corresponds to a geographic location of one or more of an entity, a system, or a user.

7. A system comprising:

one or more processing units to cause performance of operations comprising:

accessing, based at least on a relative identifier, one or more portions of element data corresponding to an element represented using map data, the one or more portions of element data being accessed by an autonomous or semi-autonomous machine that performs one or more navigation operations based at least on the relative identifier, wherein:

the map is divided into a plurality of tiles and map data corresponding to the map includes sets of tile data individually corresponding to the plurality of tiles;

the relative identifier includes a tile identifier identifying a particular set of tile data corresponding to a particular tile in relation to a reference tile of the plurality of tiles;

the particular tile includes the element;

the tile identifier has one or more pointers of a tile directory block assigned thereto;

using the reference tile, the one or more pointers point to a location in the map data of the particular set of tile data corresponding to the particular tile;

the tile directory block is separate from the map data; and the relative identifier includes an element identifier corresponding to the element and associated element data.

8. The system of claim 7, wherein;

the tile directory block is organized as a data array;

the one or more pointers correspond to one or more indexed fields in the data array; and the one or more pointers point to the location of the tile data in the map data.

9. The system of claim 7, wherein the element identifier indicates a location of the element data in the tile data, the element identifier being referenced based at least on a local reference frame corresponding specifically to the tile.

10. The system of claim 8, wherein:

the tile includes a plurality of elements; and the plurality of elements have an individual element identifier corresponding thereto and an associated pointer corresponding to an individual indexed field in one or more indexed fields in a data array of the tile directory block.

11. The system of claim 7, wherein the element data corresponds to one or more objects or characteristics of interest.

12. The system of claim 7, wherein the element data describes at least one of a street sign, an intersection, a streetlight, a traffic signal, a crosswalk, a road marking, a traffic calming device, a roundabout, a building, a restaurant, a traffic hazard, or a scenic point.

13. The system of claim 7, wherein the reference tile corresponds to a geographic location of one or more of an entity, a system, or a user.

14. The system of claim 7, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system for implementing one or more large language models (LLMs);

a system for generating synthetic data;

a system incorporating one or more virtual machines (VMs);

a system implemented at least partially in a data center; or a system implemented at least partially using cloud computing resources.

15. At least one processor comprising:

one or more circuits to cause an autonomous or semi-autonomous machine to perform one or more navigation operations based at least on autonomously accessing element data corresponding to one or more elements of a particular tile of a plurality of tiles of a map, the element data identified based at least on a relative identifier, wherein:

the relative identifier includes a tile identifier identifying a particular set of tile data corresponding to the particular tile in relation to a reference tile of the plurality of tiles;

the tile identifier has one or more pointers of a tile directory block assigned thereto;

using the reference tile, the one or more pointers point to a location in the map data of the particular set of tile data corresponding to the particular tile;

the tile directory block is separate from the map data; and the relative identifier includes an element identifier corresponding to the element and associated element data.

16. The at least one processor of claim 15, wherein:

the tile directory block is organized as an array;

the one or more pointers correspond to one or more indexed fields in the array; and the one or more indexed fields in the array correspond to the element data.

17. The at least one processor of claim 15, wherein the one or more pointers point to a location in the map data of the tile data.

18. The at least one processor of claim 15, wherein at least one element of the one or more elements includes an individual element identifier and a corresponding pointer corresponding to an individual indexed field in one or more indexed fields in an array of the directory block.

19. The at least one processor of claim 15, wherein the element data corresponds to a plurality of objects or characteristics of interest.

20. The at least one processor of claim 15, wherein the at least one processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system for implementing one or more large language models (LLMs);

a system for generating synthetic data;

a system incorporating one or more virtual machines (VMs);

a system implemented at least partially in a data center; or a system implemented at least partially using cloud computing resources.

* * * * *